United States Patent [19]

Vandling

[11] 4,146,908
[45] Mar. 27, 1979

[54] METHOD AND APPARATUS FOR DRIVING FACSIMILE TRANSCEIVERS

[75] Inventor: John M. Vandling, Pleasantville, N.Y.

[73] Assignee: Exxon Research & Engineering Co., Florham Park, N.J.

[21] Appl. No.: 622,214

[22] Filed: Oct. 14, 1975

[51] Int. Cl.² .............................................. H04N 1/36
[52] U.S. Cl. ..................................... 358/275; 358/264
[58] Field of Search ................. 178/69.5 F, 7.1, 7.3 R, 178/6.6 DD; 360/73; 331/18, 21, 25; 358/275, 264, 267

[56] References Cited

U.S. PATENT DOCUMENTS

| | | | |
|---|---|---|---|
| 2,250,284 | 7/1941 | Wendt | 331/21 |
| 2,556,970 | 6/1951 | McFarlane | 358/272 |
| 2,722,564 | 11/1955 | McFarlane | 358/275 |
| 2,835,733 | 5/1958 | Smith | 178/7.1 |
| 3,129,390 | 4/1964 | March et al. | 331/21 |
| 3,313,884 | 4/1967 | Hackenberg et al. | 178/69.5 F |
| 3,622,703 | 11/1971 | Ricketts et al. | 178/69.5 F |
| 3,794,760 | 2/1974 | Moriki | 178/69.5 TV |

Primary Examiner—John C. Martin
Attorney, Agent, or Firm—N. L. Norris

[57] ABSTRACT

In a facsimile system, rotation of a transmitter drum carrying a document is synchronized with the rotation of a receiver drum carrying a copy medium. Synchronization of the rotating transmitter drum and the rotating receiver drum is assured by driving the transmitter drum from an AC power line and locking the receiver drum to the AC power line frequency once synchronization of the transmitter drum and the receiver drum have been achieved. In order to achieve initial synchronization, the drive for the receiver drum is initially locked to a source of controlled frequency until a predetermined angular position of the receiver drum relative to a predetermined angular position of the transmitter drum is attained. The receiver motor which is of the DC type is controlled in angular frequency after initial synchronization by generating a signal having a frequency phase locked to the AC power line frequency.

17 Claims, 4 Drawing Figures

METHOD AND APPARATUS FOR DRIVING FACSIMILE TRANSCEIVERS

BACKGROUND OF THE INVENTION

This invention relates to facsimile systems comprising a transmitter, a receiver and a communications network therebetween. More particularly, this invention relates to a system where a document is scanned in a facsimile transmitter to generate electrical information-bearing signals representing dark-light variations in the document being scanned. These information-bearing signals are transmitted over the communications network to a facsimile receiver where the information-bearing signals are converted to marks or images on the copy medium so as to form a copy which is a facsimile of the original document.

Typically, the document at the transmitter circumscribes a rotatably mounted drum and a copy medium at the receiver similarly circumscribes a rotatably mounted receiver drum. The transmitter drum and the receiver drum may then be driven at substantially the same angular frequency, e.g., a frequency which may be referenced to the AC power line assuming both the transmitter and receiver are on the same power grid, so that the area of the document scanned by the optical pickup means equals the overall area of the copy medium scanned by a writing mechanism such as a stylus in a given period of time. However, driving the transmitter drum and the receiver drum at the same angular frequency does not assure that the edge of the document will necessarily correspond with the edge of the copy since the initial position of the optical pickup means with respect to the edge of the document is not necessarily the same as the initial position of the writing mechanism with respect to the edge of the copy medium.

In U.S. Pat. No. 3,872,239 the positioning of the edge of the document relative to the optical pickup means and the edge of the copy medium relative to the writing mechanism is not required since the copy medium comprises a continuous loop of material. After a facsimile transmission, the edge of the copy medium may be appropriately located by cutting the closed loop of the copy medium at the proper margin location. Where a continuous loop of the copy medium is not utilized, it is necessary to synchronize the edge of the document relative to the optical pickup means and the edge of the copy medium relative to the writing mechanism before transmitting the information content of the document to the receiver.

In copending application Ser. No. 493,119, filed July 30, 1974, now abandoned in favor of continuation application Ser. No. 676,369 filed Apr. 12, 1976, a method and apparatus is disclosed for synchronizing the angular frequencies of the transmitter and receiver drums once synchronization of the edge or margin of the document relative to the optical pickup means and the edge or margin of the copy medium relative to the writing mechanism is achieved. This is accomplished by operating the transmitter at a constant frequency determined by a first crystal oscillator and operating the receiver at an initial variable frequency until margin synchronization is achieved and then generating the same constant frequency as generated at the transmitter but under the control of a second crystal oscillator after margin synchronization has been achieved.

At the present time, a substantial number of facsimile transceivers are in commercial use which utilize the closed loop concept disclosed in the aforesaid U.S. Pat. No. 3,872,239. These transceivers are all synchronized to an AC power line. Therefore, it is necessary for any transceiver receiving from a closed loop transceiver of this type to also be synchronized to the AC power line. However, at the present time there is no equipment available which permits synchronous operation on an AC power line while also providing a margin sychronization capability.

In the closed loop transceivers of the type disclosed in the aforesaid U.S. Pat. No. 3,872,239, synchronous motors are utilized to drive the rotatable drum. Such motors are extremely effective in maintaining synchronous operation will the AC power line frequency as long as there is no interruption in power. However, a brief interruption in the power can cause a loss of synchronization which can result in an illegible or at least highly distorted facsimile or copy.

SUMMARY OF THE INVENTION

It is an object of this invention to provide a facsimile transceiver which is capable of being synchronized with an AC power line frequency while at the same time providing a margin synchronization capability.

In accordance with this and other objects, a preferred embodiment of the invention in a facsimile unit comprises a scanning means, information transducer means associated with the scanning means for scanning through various scanning positions at a scanning frequency, and scanning drive means coupled to the scanning means for driving the scanning means through various scanning positions.

The improvement comprises drive means for driving the scanning means at an angular frequency synchronized to a frequency substantially independent of the AC power line and differing therefrom. A signal detector means detects synchronization signals generated at a remote facsimile unit and representing the scanning position at the remote unit. A synchronism detector means detects when the transducer means scanning position has achieved a predetermined synchronized relationship with the scanning position at the remote unit. The drive means then drives the scanning means at a frequency synchronized to the AC power line frequency upon synchronism as detected by the synchronism detector means.

In a preferred embodiment of the invention, the drive means comprises means for generating an accurate independent reference signal having a reference frequency substantially independent of the frequency of the AC line and means for generating an AC line reference signal having a line indicative frequency substantially proportional to the AC line frequency. Means also generate a speed indicative signal having a frequency substantially proportional to the scanning frequency. Phase comparison means compare the independent frequency to the speed indicative frequency until margin synchronism is detected by the synchronism detector means and the scanning means is driven so as to maintain phase lock therebetween and thereafter the phase comparison means compare the AC line indicative frequency to the speed indicative frequency and drive the scanning drive so as to maintain phase lock therebetween.

In accordance with another important aspect of the invention, a means for generating the AC line reference signal comprises a phase locked loop including a source of an internally generated signal which is phase locked to the line indicative frequency. The phase locked loop is characterized by a sufficiently large time constant such that the frequency of the internally generated signal remains substantially the same even in the absence of AC power on the AC power line for a period of at least several cycles thereof.

The drive means further comprises a bandpass filter tuned to the AC line indicative frequency so as to eliminate any discontinuities in the AC line reference signal. The bandpass filter may be characterized by sufficiently high Q so as to ring for several cycles substantially at the frequency of the AC power line indicative frequency even in the absence of AC power. By providing energy storage means in the facsimile unit, the scanning drive means can continue to run even in the absence of AC power.

DETAILED DESCRIPTION OF A PREFERRED EMBODIMENT OF THE INVENTION

Figure 1:
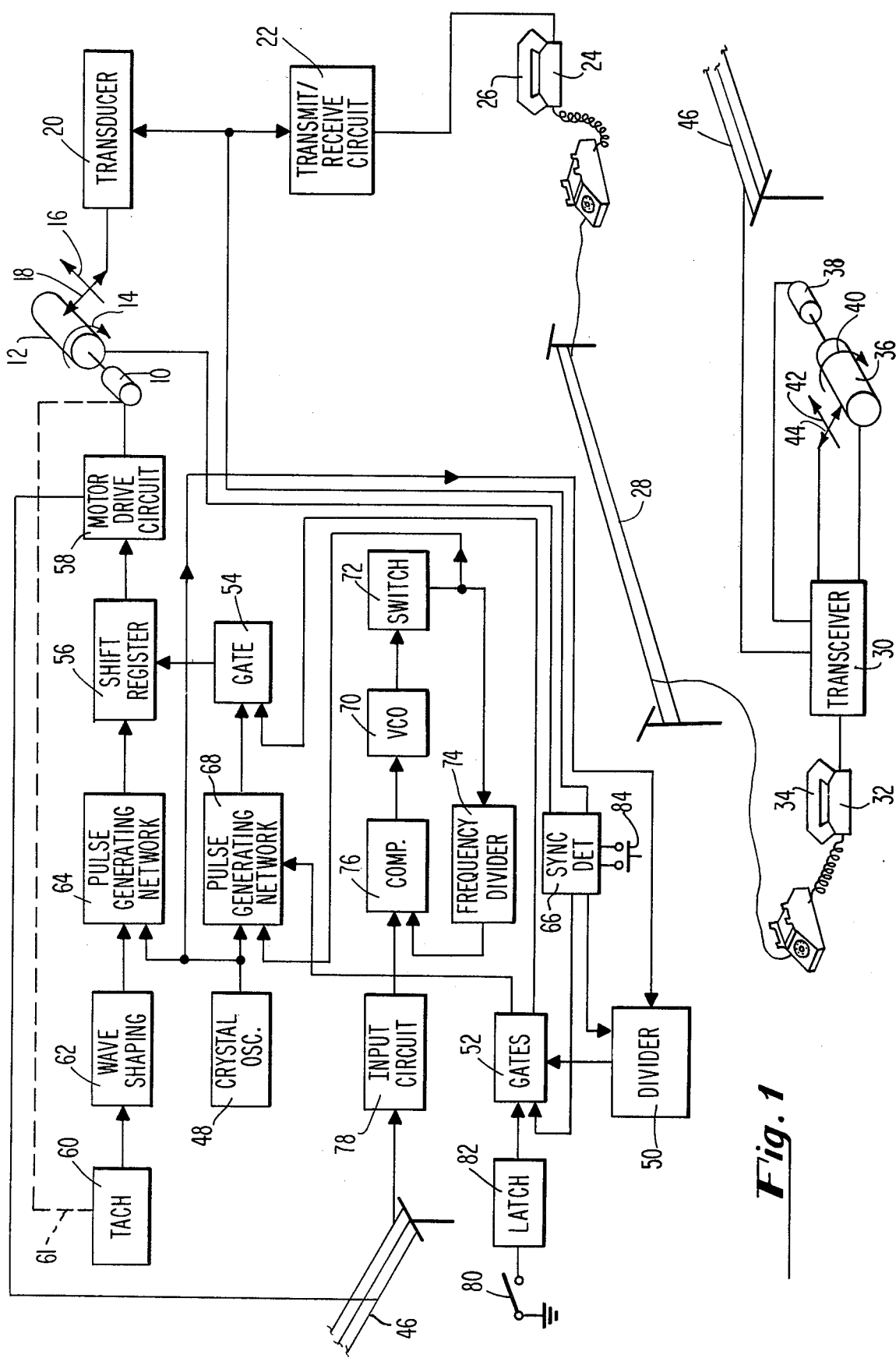
FIG. 1 is a block diagram of a facsimile system embodying the invention.

Referring now to the facsimile system shown in FIG. 1, a first facsimile transceiver comprises a rotatably mounted drum 12 rotatably driven by the motor 10 in a direction depicted by an arrow 14 so as to create a relative scanning movement between a document or copy medium carried by the drum 12 and a scanning head not shown as the bead assumes various scanning positions. As the scanning head is advanced axially along the drum 12 as indicated by an arrow 16 and the drum 12 rotates about its axis as indicated by the arrow 14, successive paths on the document or copy medium are placed in communication as depicted by a line 18 with suitable transducer means 20 including a photodetector and stylus not shown.

When the transceiver is operating in a transmit mode, the photodetector of the transducer 20 detects variations in light intensity due to the reflectivity of the document as the document is being scanned by the photodetector via a path of optical communication as depicted by the line 18. The output from the photodetector of the transducer 20 is then applied to the transmission circuit of a transmit/receive circuit 22. When the transceiver is operating in a receiving mode, the transmit/receive circuit demodulates signals representing dark-light variations in a remotely located document and the output of the receive circuitry is applied to the transducer means 20 for energizing the stylus thereof so as to mark on the copy medium carried by the drum 12 in the area of communication as depicted by the line 18.

The transmit/receive circuit 22 is connected to an acoustical coupler 24 which is associated with a conventional telephone handset 26. The handset 26 is then connected to a suitable communications link such as conventional telephone lines 28 which permit the tansceiver to transmit to or receive from another remotely located transceiver 30 which is associated with another acoustical coupler 32 and a telephone handset 34.

The transceiver 30 comprises a rotatably mounted drum 36 which is rotatably driven by a motor 38 so as to create a rotational motion as depicted by an arrow 40. In addition, a scanning head not shown is moved axially along the drum 36 in a direction depicted by an arrow 42. As a result, successive paths on the document or copy medium carried by the drum 36 are placed in communication as depicted by a line 44 with suitable transducer means of the transceiver 30 including a photodetector and stylus not shown.

As shown in FIG. 1, the transceiver 30 including the motor 38 is powered by a reduced voltage from power lines in a power grid 46. Although not shown in detail, FIG. 1 is intended to depict a motor 38 of the synchronous type having an angular frequency synchronized to the frequency of the power grid 46 as disclosed in the aforesaid U.S. Pat. No. 3,872,239.

In accordance with this invention, the motor 10 is initially driven at an angular frequency synchronized to a frequency independent of the AC power line frequency and differing therefrom and subsequently driven at an angular scanning frequency synchronized to the AC power line once margin synchronization between a copy medium circumscribing the drum 12 and a document circumscribing the drum 36 has been achieved. The method and means by which the synchronous drive of the motor 10 is provided will not be described in detail with reference to FIG. 1.

Prior to margin synchronization between the copy medium on the drum 12 and the document on the drum 36 is achieved, the motor 10 is rotatably driven under the control of clock pulses generated by a crystal oscillator 48 which is independent of the frequency of the AC power line 51 which supplies the receiving transceiver comprising the motor 10. The clock pulses from the crystal oscillator 48 are applied to a frequency divider 50 which generates a signal or a pulse train having a frequency independent of and differing from the power line frequency on the power grid. The pulse train from the divider 50 is applied to gate circuitry 52 which in turn applies the pulse train to a gate circuit 54 when a facsimile transmission is initiated but prior to synchronization between the margins of the document and copy medium. The gate 54 in turn applies the pulse train to a shift register 56 in a phase locked loop which has an output coupled to a motor drive circuit 58.

The phase locked loop which drives the motor 10 comprises a tachometer 60 which may comprise a winding coupled to a rotating permanent magnet armature of the motor 10 as depicted by a broken line 61. The output from the winding of the tachometer 60 is applied to a wave shaping network 62. The pulse generating network 64 is coupled to the output of the wave shaping network 62 so as to form pulses which are applied to the shift register 56 for comparison with the pulse from divider 50. It will therefore be understood that the locked loop including the tachometer 60, the wave shaping network 62 and the pulse generating network 64 generates a signal characterized by a speed indicative frequency which is compared with the independent frequency of the pulse train from the divider 50. The output from the shift register 56 generates a signal which is applied to the motor drive circuit 58 to adjust the angular speed or frequency of the motor 10 so as to achieve speed at the motor 10 which is proportional to the frequency of pulses from the divider 50.

A sync detector 66 is provided to compare signals representing the angular position of the drum 12 with the angular position of the drum 36 which is detected by demodulating an appropriate drum position indicating signal at the transmit/receive circuit 22. Once margin synchronization has been detected by the sync detector 66, the gate circuit 52 inhibits the application of the pulse train of independent frequency to the gate 54. Simultaneously, the gate circuitry 52 enables a pulse generating network 68 which is coupled to circuitry which generates a line reference signal having a frequency proportional and phase locked to the AC line frequency of the power grid 46. The output from the pulse generating network 68 is then applied to the gate 54 for application to the shift register 56 and phase comparison with the speed indicative pulses from the pulse generating network 64 in the motor control phase locked loop. The AC line reference signal is generated by another phase locked loop comprising a VCO (voltage controlled oscillator) 70, a switch 72, a frequency divider 74 and a phase comparator 76. The phase comparator 76 compares the phase and frequency of the VCO output as divided by the frequency divider 74 with an AC line reference signal conditioned by an input circuit 78 so as to generate a line reference signal at the output of the switch 72 for application to the pulse generating network 68 which has a frequency substantially proportional and phase locked to the AC line frequency on the power grid 46.

In accordance with one important aspect of the invention, the phase locked loop comprising the VCO 70 has a sufficiently large time constant such that the frequency of this internally generated signal remains substantially the same even in the absence of AC power for a plurality of cycles. Preferably, a time constant sufficiently large is provided so as to continue substantially the same frequency for at least 10 cycles for the AC power and preferably 20 to 30 cycles thus spanning most common short term power line interruptions and preventing loss of angular synchronization between the receiver and transmitter drum.

In accordance with another important aspect of the invention, the input circuit 78 comprises a peak clipper and a bandpass filter tuned to the frequency of the AC power line so as to substantially attenuate interfering signals superimposed on the AC frequency of the power grid 46. Furthermore, the bandpass filter in the input circuit 78 has a sufficiently high Q so as to ring for several cycles near or substantially at line frequency even in the absence of AC power thus assuring that the input frequency to the comparator 76 from the input circuit 78 will not radically depart from normal line frequency even in the absence of power for a short period of time. This coupled with a long time constant of the phase locked loop will assure that the VCO 70 will continue to oscillate at a frequency which will sustain synchronization during a brief power failure assuming a power storage capacity has been provided to momentarily sustain power to the motor 10.

As shown in FIG. 1, the facsimile transceiver comprising the motor 10 and the drum 12 includes a switch 80 and a latch 82 so as to permit the transceiver to operate continuously from the pulse train from the divider 50 without switching to the AC line frequency when margin sychronization has been achieved. This is accomplished through the gate circuitry 52 which deactivates the pulse generating network 68 and is continuously enabled by the latch 82 so as to apply the series of pulses from the divider 50 to the gate 54 regardless of the output of the sync detector 66. However, the frequency of the pulses from the divider 50 will vary in response to the output of the sync detector 66 as various degrees of margin synchronism are detected.

In order to permit the facsimile transmitter to operate from the AC line frequency without any margin synchronization, a shunt 84 is provided at two terminals of the sync detector 66. Closing the shunt 84 and switch 80 will immediately enable or activate the pulse generating network 68.

As shown in FIG. 1, the pulse generating networks 64 and 68 are coupled to the output of the crystal oscillator 48. The manner in which the crystal oscillator generates pulses having a frequency proportional to the speed indicative signal generated by the tachometer 60 and the pulse generating network 64, and the way in which the pulse generating network 68 generates a series of pulses having a frequency proportional to the AC line frequency will now be described in detail with reference to FIG. 2.

The pulse shaping network 64 comprises a first flip-flop 100, a second flip-flop 102, a NAND gate 104 and an inverter 106. Input A of the flip-flop 100 is a square wave of a frequency equal to the speed indicative frequency provided by the tachometer 60, e.g., 480 Hz. Input B of the flip-flop 100 is a square wave having a frequency of the crystal oscillator 48, e.g., 2 MHz. For each low-to-high transition of the clock oscillator input B to the flip-flop 100, the state of the input A is strobed through the flip-flop 100 to an output terminal C. In other words, a transition from low-to-high at input B of the flip-flop 100 will strobe the logic level on data input A and cause this level to be present on output C in response to the first low-to-high transition of the input B.

The output C is applied to a NAND gate 104 along with the clock pulses and an output D from the flip-flop 102. The output E of the NAND gate 104 will go low as long as all inputs are high. Thus, where the output C of the flip-flop 100 goes high, the output E from the NAND gate 104 will remain low since the output C is high for the duration of the clock pulses as well as the output D from the flip-flop 102. At the conclusion of the clock pulse at input B, the output E of the NAND gate 104 goes high and input D of the NAND gate 104 goes low. The low at input D remains in control of the gate 104 during the remainder of the half cycle of the square wave at the input A such that subsequent clock pulses have no effect.

In the next half cycle of the square wave at input A, the low at input D goes high when the low at input A is strobed through by the low-to-high transition at input B since the flip-flop 102 is cleared by the low at output C forcing the input D to the NAND gate 104 high. Since the output C continues to be low during this half cycle, the output from the NAND gate 104 at terminal E remains high until the waveform C again does high. It will therefore be understood that the pulse generating network 64 generates one pulse at output E of the NAND gate 104 of a width equal to the width of the high portion of a clock pulse at the input B for each cycle of the tachometer square wave. This pulse is inverted at an inverter 106 so as to produce a positive going pulse at output F which is applied to an input of the shift register 56.

Figure 2:
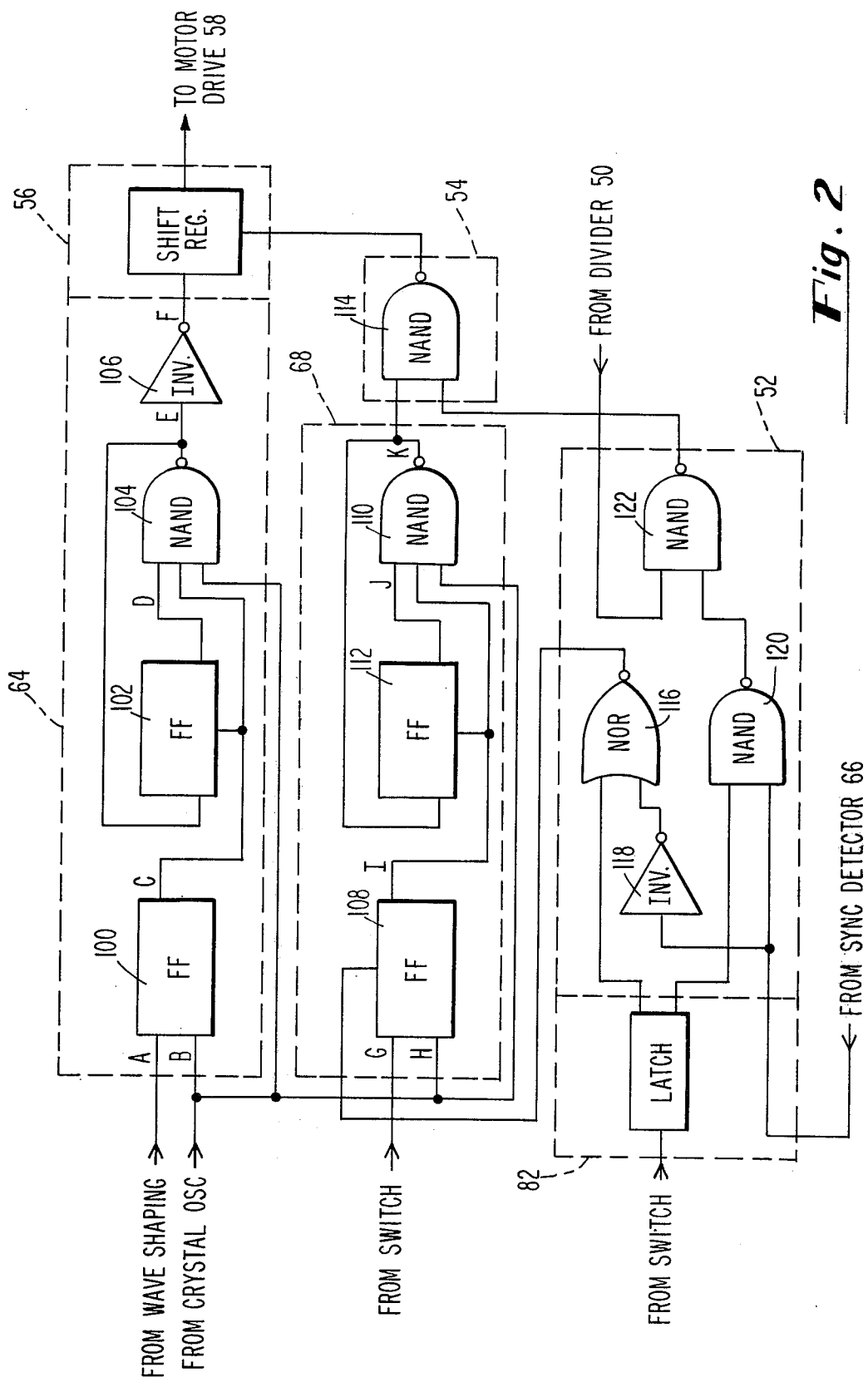
FIG. 2 is a schematic diagram of portions of the block diagram shown in FIG. 1.

As shown in FIG. 2, the pulse generating network 68 comprises components similar to that of the pulse shaping network 64. More particularly, the pulse generating network 68 comprises a flip-flop 108 having data input G connected to the output from the switch 72 shown in FIG. 1 and the clock input H connected to the oscillator. An output I from the flip-flop 108 is applied to a NAND gate 110 having other inputs connected to an output J of a flip-flop 112 and the crystal oscillator 48. The output K of the NAND gate 110 is connected back to the flip-flop 112.

As in the case of the network 64, the pulse generating network 68 generates a series of pulses having a frequency proportional and phase locked to the frequency of the power on the grid 46 and having a duration substantially equal to the high portion of a clock pulse generated by the crystal oscillator. In the interest of brevity, the function of the flip-flops 108 and 112 and the NAND gate 110 will not be described in detail except to indicate that the function is substantially the same as that of the pulse generating network 64.

The output from the pulse generating network is applied to the gate circuit 54 shown in FIG. 1 which comprises a NAND gate 114 as shown in FIG. 2. Thus, the pulse train generated by the pulse generating network 68 is inverted by the NAND gate 114 so as to apply a series of positive going pulses to another input of the shift register 56.

The NAND gate 114 also has an input which is coupled to the pulse train from the divider 50 through gate circuitry 52 as shown in FIG. 2. The gate circuitry 52 serves two functions. On the one hand, gate circuitry 52 allows the operator of the transceiver to operate in a strictly crystal oscillator controlled mode by deactivating the flip-flop 108 and activating NAND gate 112. On the other hand, the gate circuitry allows the facsimile transceiver to operate in a crystal controlled mode only during margin synchronization then switching to synchronization with the AC power grid 46.

In accordance with this invention, the operator may select a combination crystal/AC line synchronous mode by closing the switch 80 which sets a latch 82 so as to place a low on one input of the NOR gate 116. Prior to margin synchronization, an inverter 118 applies a high input to the NOR gate 116 as a result of a low output from the sync detector 66. The resulting low output of the NOR gate 116 inhibits the flip-flop 108 during margin synchronization. Simultaneously, the low from the sync detector 66 is applied to a NAND gate 120 so as to assure a high at one input of a NAND gate 122 thereby permitting the pulses in the pulse train from the divider 50 to be applied to the NAND gate 114 for application to the shift register 56.

When margin synchronization is achieved, the output from the sync detector 66 goes high so as to produce a low from the output of the inverter 118 at one input to the NOR gate 116. With two lows at the input of the NOR gate 116, the output goes high so as to enable the flip-flop 108 of the pulse generating network 68 so as to apply pulses phase locked to the power line frequency to the NAND gate 114 for application to the shift register 56. Simultaneously, the high output from the sync detector 66 will produce a low at the output of the NAND gate 120 so as to block the application of the pulse train from the divider 50 to the NAND gate 114.

When the transceiver is to operate in a strictly crystal synchronous mode, the output of the latch 82 which is applied to the NOR gate 116 remains high thereby inhibiting the flip-flop 108 of the pulse generating network 68. Simultaneously, the output of the latch 82 applied to the NAND gate 120 is low so as to produce a high at the output thereof which permits the pulses in the pulse train from the divider 50 to be applied to the NAND gate 114 and the shift register 56.

When the transceiver is to operate in a strictly AC line synchronous mode, the shunt 84 shown in FIG. 1 is closed so as to produce a continuous high from the output of the sync detector 66. This high from the sync detector 66 in combination with the setting of the latch 82 in response to closure of the switch 80 will enable the flip-flop 108 so as to apply pulses which are phase locked to the AC line frequency to the NAND gate 114 and the shift register 56.

Figures 3, 4:
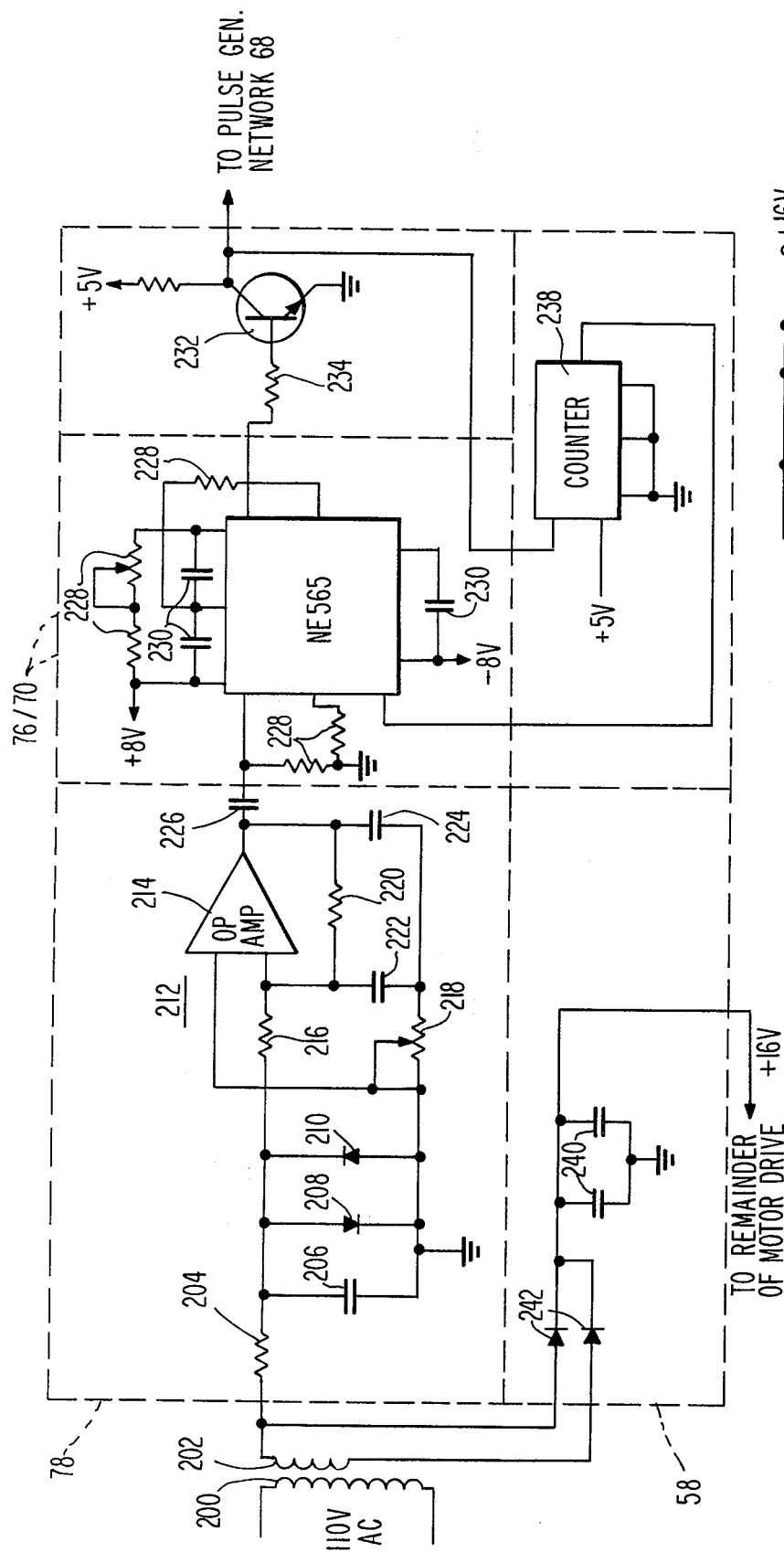
FIG. 3 is a schematic diagram of other portions of the block diagram shown in FIG. 1.
FIG. 4 is a schematic diagram of still other portions of the block diagram shown in FIG. 1.

Reference will now be made to FIG. 3 and the circuitry therein which forms the means by which a signal is developed having a frequency proportional and phase locked to the AC line frequency of the power grid 46. As shown in FIG. 3, the AC power line voltage is applied to a primary 200 and stepped down to approximately 16 volts AC at a secondary 202. The 16 volts across the secondary 202 is applied to the input circuit 78 which comprises a current limiting resistor 204. The resistor 204 also serves a filter function in conjunction with a capacitor 206 so as to eliminate the relatively high frequency discontinuities in the sinusoidal AC signal applied to the input circuit 78. After filtering, the sinusoidal signal is applied to oppositely poled, parallel connected diodes 208 and 210 which provide a constant amplitude square wave which is then applied to a bandpass filter 212 comprising an operational amplifier 214 in addition to resistors 216, 218 and 220 and capacitors 222 and 224.

In accordance with one important aspect of the invention, the bandpass filter is tuned to the nominal line frequency of the AC power grid 46 and is further characterized by a high Q. As a result, the bandpass filter 212 will continue ringing with a damped oscillation at or near the nominal power line frequency for a plurality of 10 cycles and preferably 20 to 30 cycles during brief power interruptions.

The output from the bandpass filter 212 is coupled to an integrated circuit in the form of an NE565 phase locked loop manufactured by Signetics Corporation through a DC decoupling capacitor 226. The NE565 in combination with the resistors 228 and the capacitors 230 provide the VCO 70 of FIG. 1 of the phase locked loop with a desirably long time constant so that rapid fluctuations in the frequency or a brief loss of signal applied to the comparator 76 will not immediately affect the output of the VCO 70. This allows the motor 10 to remain in synchronization with the AC power line frequency during the power interruption while slowly drifting back to the normal free running frequency of the VCO which is nearly phase locked to the power line frequency.

The output of the VCO 70 in the NE565 is coupled to a transistor 232 through a base resistor 234. The transistor 232 has a collector connected to a +5 volt power supply through a resistor 236 and serves as a switch which generates a square wave having a frequency equal to the frequency of the output from the VCO 70. The square wave at the collector of the transistor 232 of the switch 72 is then applied to the pulse generating network 68 as shown in FIGS. 1 and 2.

The phase locked loop which generates the square wave applied to the pulse generating network 68 also includes the frequency divider 74 of FIG. 1 which comprises a divide-by-eight counter 238 as shown in FIG. 3. The output from the divide-by-eight counter is applied back to the comparator 76 in the NE565. In the particularly preferred embodiment, the frequency of the square wave at the collector of the transistor 232 is 480 Hz. so that the divide-by-eight counter 238 produces a 60 cycle output for comparison with the filtered line frequency applied to the comparator 76.

As stated in the foregoing, a bandpass filter 212 with a high Q and the phase locked loop with the large time constant permits the transceiver to remain synchronized to the power line frequency even though there is a brief interruption in the AC power on the line 46. Of course, this assumes that the motor 10 continues to be supplied power during the period of the power interruption. In order to provide this continuation of power, the power supply for the motor 10 is provided with a storage capacity including a pair of parallel capacitors 240 charged by a pair of rectifying diodes 242. The capacitors 240 are charged to a sufficient voltage during normal operation so as to permit the charge on the capacitors 240 to sustain the operation of the motor drive circuit 58 of FIG. 1 during the power interruption. Of course, other energy storage devices may be utilized in place of the capacitors 240 such as nickel cadmium batteries.

The remainder of the motor drive circuit 58 described partially in connection with FIG. 3 and shown in block form in FIG. 1 will now be described in further detail with reference to FIG. 4. As shown in FIG. 4, the square wave output from the shift register 56 which results from the application of shift left pulses generated by the tachometer 60 and shift right pulses generated by the pulse train from the gate 54 is applied to a motor switching circuit which drives the DC motor 10.

The motor drive circuit 58 includes a resistor 300 which couples the square wave from the shift register 56 to a first transistor 302 of three drive transistors. The collector of the transistor 302 is connected to the base of a second transistor 304 through a resistor 306. A capacitor 328 is provided for high frequency attenuation and stability in the voltage regulator portion of the circuit. Resistor 306 and the base of the transistor 304 are in turn coupled to a +16 volt power supply through a resistor 308 while the emitter of the transistor 302 is connected to ground through a resistor 310 and a relay 312 which is closed when the transceiver is in operation. When the relay 312 is open, the emitter of the transistor 302 is held positive by a +5 volt power supply through a resistor 314. The collector of the transistor 304 is connected to the base of a driving transistor 316. In order to regulate the voltage applied to the DC motor 10, a voltage regulating network consisting of a diode 318, a resistor 320 and the resistor 310 in the emitter circuit of the transistor 302. A resistor 322 is connected between the emitter and the base of the drive transistor 316 which serves to shunt collector to base leakage.

Clamping diodes 324 and 326 are connected across the motor 10 and the drive transistor 316 so as to prevent the emitter voltage on the drive transistor 316 from going below ground or above the +16 volt power supply. Any excess energy in the motor inductance will be shunted by the diode 324 while any positive spikes which occur will be conducted through the diode 326 so as to protect the transistor 316.

In normal operation when the motor 10 is synchronized to the AC line frequency or the frequency of the pulse train from the divider 50, the duty cycle of the square wave will be approximately 50%. In other words, the transistor 316 will conduct approximately 50% of the time in driving the motor 10.

Although the details of the divider 50 and the sync detector 66 have not been shown and described, such details are disclosed in the aforesaid copending application Ser. No. 493,119 filed July 30, 1974 which is incorporated herein by reference. In this connection it will be appreciated that the divider 50 in a preferred embodiment of the invention will generate a pulse train having a frequency of approximately 480 Hz. once margin synchronization has been achieved. Prior to margin synchronization, slightly lower or higher frequencies will be utilized to bring the margins of the copy medium on the drum 12 and the document on the drum 36 into synchronization. Use of a divider having a pulse train frequency of 480 Hz. is compatible with the use of the divide-by-eight counter 238 which provides a 60 Hz. power line frequency at the phase comparator 76 provided by the NE565 phase locked loop. This assures that the output from the switch 72 comprising the transistor 232 has a frequency of 480 Hz.

In the foregoing, the selection of crystal zinc, line sync or a combination thereof has been performed manually. It is of course possible to have the selection performed automatically in accordance with the techniques disclosed in copending application Ser. No. 617,104 filed Sept. 26, 1975, now U.S. Pat. No. 4,079,425, which is assigned to the assignee of this invention.

Although the details of the transmit/receive circuit 22 have not been shown in detail, such details are disclosed in application Ser. No. 606,507 filed Aug. 21, 1975, now U.S. Pat. No. 4,015,077 and Ser. No. 606,506 filed Aug. 21, 1975, both of which are assigned to the assignee of this invention and incorporated herein by reference.

Although a preferred embodiment of the invention has been shown and described, it will be understood that various modifications of the invention may be made which fall within the true spirit and scope of the invention as set forth in the appended claims.

What is claimed is:

1. A facsimile unit adapted to be synchronized to an AC reference signal having an AC line indicative frequency phase locked to and substantially proportional to an AC power line frequency comprising scanning means, information transducer means associated with said scanning means during scanning through various positions at a scanning frequency and scanning drive means coupled to said scanning means for driving said scanning means through said various positions; the improvement comprising:

means for generating an independent reference signal having a reference frequency substantially independent of said AC line frequency and differing therefrom;

means for generating a speed indicative signal having a frequency substantially proportional to the scanning frequency of said scanning means;

signal detector means for detecting synchronization signals generated at a remote facsimile unit and representing the scanning position at said remote unit;

synchronism detector means for detecting when the position of said scanning means has achieved a predetermined relationship simultaneously with the existence of a predetermined scanning position at said remote unit as indicated by said detector means; and means for comparing said reference frequency of said independent reference signal to said frequency of said speed indicative signal until synchronism is detected by said synchronism detector means and driving said scanning drive means so as to minimize the frequency therebetween and thereafter comparing said AC line indicative frequency of said AC reference signal to said frequency of said speed indicative signal and driving said scanning drive means so as to minimize the difference therebetween.

2. The facsimile unit of claim 1 wherein said AC reference signal is generated by a means comprising a phase locked loop including a source of an internally generated signal which is phase locked to said line indicative frequency, said phase locked loop having a sufficiently large time constant such that the frequency of the internally generated signal remains substantially the same even in the absence of the AC power on said AC power line for a period of several cycles of said AC power line.

3. The facsimile unit of claim 2 wherein said means for generating said AC line reference signal further comprises a band pass filter turned to said AC line indicative frequency so as to attenuate any discontinuities in said AC line reference signal.

4. The facsimile unit of claim 3 wherein said bandpass filter has a sufficiently high Q so as to ring for several cycles substantially at the frequency of said AC line indicative frequency even in the absence of an AC power line signal.

5. The facsimile unit of claim 4 including energy storage means for continuing to drive said scanning drive means even in the absence of an AC power line signal.

6. A method of maintaining synchronization in a facsimile system comprising a receiver having scanning means for scanning a copy medium and information transducer means juxtaposed to said copy medium for scanning various positions thereof, a transmitter having scanning means for scanning a document and information transducer means juxtaposed to said document for scanning various positions thereof, and a communications link carrying signals between the transmitter and the receiver, the method comprising the following steps:

scanning with one information transducer means at a first scanning frequency synchronized to the frequency of the AC power line and another transducer means at a second scanning frequency synchronized to a frequency independent of and derived from a source different from said AC line frequency and differing from the frequency of said AC power line;

generating a first control signal having a frequency proportional to said independent frequency;

generating a tach signal having a frequency proportional to said second scanning frequency;

comparing the frequency of said tach signal and the frequency of said first control signal;

adjusting said second scanning frequency so as to minimize the frequency differential between said first control signal and said tach signal;

detecting when said one transducer means and said other transducer means have achieved predetermined relative scanning positions so as to represent margin synchronization of said copy medium and said document;

generating a second control signal having a frequency proportional to the frequency of said AC power line frequency;

comparing the frequency of said tach signal and the frequency of said second control signal;

adjusting said second scanning frequency so as to minimize the frequency differential between said second control signal and said tach signal; and scanning with said one information transducer means and said other information transducer means at scanning frequencies synchronized to said AC power line after a margin synchronization has been achieved.

7. The method of claim 6 wherein said second control signal is continuously generated for a plurality of cycles at substantially the same frequency even in the absence of an AC power line signal.

8. A facsimile unit adapted to be synchronized to an AC line indicative frequency comprising scanning means, information transducer means associated with said scanning means for scanning through various positions at a scanning frequency, and scanning drive means coupled to said scanning means for driving said scanning means through various scanning positions; the improvement comprising:

signal detector means for detecting synchronization signals generated at a remote facsimile unit and representing the scanning position at said remote unit;

means for generating an AC line reference signal having an AC line indicative frequency substantially phase locked to the AC line frequency and substantially immune to any discontinuities in said AC line frequency;

means for generating an independent reference signal having a reference frequency substantially independent of said AC line frequency;

said scanning drive means driving said scanning means at a scanning frequency synchronized to said reference frequency substantially independent of the AC line indicative frequency and differing therefrom;

synchronism detector means for detecting when the scanning position of said scanning means has achieved a predetermined relationship with the scanning position at said remote unit as indicated by said detector means; and said scanning drive means also driving said scanning means at a scanning frequency synchronized to said AC line indicative frequency upon synchronism as detected by said synchronism detector means.

9. The facsimile unit of claim 8 wherein said scanning drive means comprises:

means for generating a speed indicative signal having a frequency substantially proportional to the scanning frequency of said scanning means; and means for comparing said independent frequency to said speed indicative frequency until synchronism is detected by said synchronism detector means and driving said scanning means so as to minimize the frequency difference therebetween and thereafter comparing said line indicative frequency to said speed indicative frequency and driving said scanning means so as to minimize the difference therebetween.

10. The facsimile unit of claim 9 wherein said means for generating said AC line reference signal comprises a phase locked loop including a source of an internally generated signal which is phase locked to said line indicative frequency, said phase locked loop having a sufficiently large time constant such that the frequency of the internally generated signal remains substantially the same even in the absence of the AC power on the AC power line for a period of several cycles of said AC power line frequency.

11. The facsimile unit of claim 10 wherein said means for generating an AC line reference signal comprises a band pass filter having a sufficiently high Q so as to ring for several cycles substantially at the frequency of said AC line indicative frequency even in the absence of an AC power line signal.

12. The facsimile unit of claim 10 including energy storage means for continuing to drive said scanning means even in the absence of an AC power line signal.

13. A facsimile unit comprising scanning means, information transducer means juxtaposed to said scanning means during scanning through various scanning positions, and scanning drive means coupled to said scanning means for driving said scanning means through various scanning positions, means for generating a scanning frequency indicative signal having a frequency proportional to the frequency of scanning, means for generating a signal having an AC line indicative frequency proportional to an AC power line frequency, means for comparing said scanning frequency to said AC line indicative frequency, said scanning drive means driving said scanning means at a frequency so as to minimize the difference between said AC line indicative frequency and said scanning frequency, the improvement residing in said means for generating a signal having an AC line indicative frequency comprising:

a phase locked loop including a source of internally generated signal which is phase locked to said line indicative frequency, said phase locked loop having a sufficiently large time constant such that the frequency of the internally generated signal remains substantially the same even in the absence of AC power on said AC power line for a period of a plurality of cycles of said AC power and despite discontinuities in the AC power frequency.

14. The facsimile unit of claim 13 wherein said means for generating a signal having an AC line indicative frequency further comprises a band pass filter tuned to said AC line indicative frequency.

15. The facsimile unit of claim 14 wherein said band pass filter has a sufficiently high Q so as to ring for a plurality of cycles substantially at a frequency of said AC line indicative frequency even in the absence of AC power.

16. The facsimile unit of claim 15 including energy storage means for continuing to drive said scanning means even in the absence of AC power.

17. A facsimile unit adapted to be synchronized to an AC reference signal having an AC line indicative frequency phase locked to and substantially proportional to an AC line frequency comprising scanning means, information transducer means associated with said scanning means during scanning through various positions at a scanning frequency and scanning drive means coupled to said scanning means for driving such scanning means through said various positions, the improvement comprising:

signal detector means for detecting synchronization signals generated at a remote facsimile unit and representing the scanning position at said remote unit;

synchronism detector means for detecting when the position of said scanning means has achieved a predetermined relationship simultaneously with the existence of a predetermined scanning position at said remote unit as indicated by said detector means; and drive selection means coupled to said scanning means for selectively driving said scanning means at a scanning frequency synchronized to said line indicative frequency before and upon synchronism as detected by said synchronism detector means, or, alternatively, for selectively driving said scanning means at a scanning frequency substantially independent of and derived from a source different from the line indicative frequency and differing from that frequency before synchronism as detected by said synchronism detector means and at a scanning frequency synchronized to said AC line indicative frequency upon synchronism as detected by said synchronism detector means.

* * * * *